(No Model.)

J. S. McTEAR.
CALENDAR PUZZLE.

No. 454,831.

6 Sheets—Sheet 1.

Patented June 23, 1891.

Fig. O.

| Jan'y | 2 | 4 | 8 | 10 | 14 | 16 | 20 | ✳ | ✳ | R |
|---|---|---|---|---|---|---|---|---|---|---|
| | 22 | 26 | 28 | Feb'y | 1 | 3 | 7 | 9 | ✳ | B |
| 13 | 15 | 19 | 21 | 25 | 27 | Mar | 3 | 5 | 9 | 11 | R |
| | 15 | 17 | 21 | 23 | 27 | 29 | April | 2 | 4 | 8 | B |
| ✳ | 10 | 14 | 16 | 20 | 22 | 26 | 28 | May | 2 | 4 | R |
| ✳ | 8 | 10 | 14 | 16 | 20 | 22 | 26 | 28 | June | 1 | B |
| 3 | 7 | 9 | 13 | 15 | 19 | 21 | 25 | 27 | July | 1 | R |
| 3 | 7 | 9 | 13 | 15 | 19 | 21 | 25 | 27 | 31 | ✳ | B |
| Aug't | 2 | 6 | 8 | 12 | 14 | 18 | 20 | 24 | 26 | 30 | R |
| Sept | 1 | 5 | 7 | 11 | 13 | 17 | 19 | 23 | 25 | 29 | B |
| Oct | 1 | 5 | 7 | 11 | 13 | 17 | 19 | 23 | 25 | 29 | 31 | R |
| Nov | 4 | 6 | 10 | 12 | 16 | 18 | 22 | 24 | 28 | 30 | B |
| Dec'r | 4 | 6 | 10 | 12 | 16 | 18 | 22 | 24 | 28 | 30 | R |

Fig. O.ᴬ

| Jan'y | 1 | 5 | 7 | 11 | 13 | 17 | 19 | ✳ | ✳ | B |
|---|---|---|---|---|---|---|---|---|---|---|
| | 23 | 25 | 29 | 31 | Feb'y | 4 | 6 | 10 | ✳ | R |
| 12 | 16 | 18 | 22 | 24 | 28 | Mar | 2 | 6 | 8 | 12 | B |
| | 14 | 18 | 20 | 24 | 26 | 30 | April | 1 | 5 | 7 | R |
| ✳ | 11 | 13 | 17 | 19 | 23 | 25 | 29 | May | 1 | 5 | B |
| 7 | 11 | 13 | 17 | 19 | 23 | 25 | 29 | 31 | June | 1 | R |
| 6 | 10 | 12 | 16 | 18 | 22 | 24 | 28 | 30 | July | 4 | B |
| ✳ | 6 | 10 | 12 | 16 | 18 | 22 | 24 | 28 | 30 | ✳ | R |
| Aug't | 3 | 5 | 9 | 11 | 15 | 17 | 21 | 23 | 27 | 29 | B |
| Sept | 2 | 4 | 8 | 10 | 14 | 16 | 20 | 22 | 26 | 28 | R |
| Oct'r | 2 | 4 | 8 | 10 | 14 | 16 | 20 | 22 | 26 | 28 | B |
| Nov | 1 | 3 | 7 | 9 | 13 | 15 | 19 | 21 | 25 | 27 | R |
| Dec | 1 | 3 | 7 | 9 | 13 | 15 | 19 | 21 | 25 | 27 | 31 | B |

Witnesses:
Jno. Bleday
E. K. Sturtevant

Inventor:
John S. McTear
by Pollok & Mauro
his attorneys.

(No Model.)  
6 Sheets—Sheet 2.

J. S. McTEAR.  
CALENDAR PUZZLE.

No. 454,831.  Patented June 23, 1891.

Fig. 1.

Fig. 1ª.

Witnesses:  
Jonás B. Ceilen  
E. K. Sturtevant

Inventor  
John S. McTear  
by Pollok & Mauro,  
his attorneys.

(No Model.)

J. S. McTEAR.
CALENDAR PUZZLE.

No. 454,831. Patented June 23, 1891.

Fig. II.

| Jany | 5 | 6 | 10 | 11 | 12 | 14 | 15 | ✗ | ✗ | R |
|---|---|---|---|---|---|---|---|---|---|---|
|  | 19 | 20 | 21 | Feby | 3 | 4 | 5 | 9 | 12 | B |
| 13 | 14 | 18 | 23 | Mar | 1 | 5 | 6 | 7 | 9 | 10 | R |
| 14 | 15 | 16 | 29 | 30 | 31 | April | 4 | 7 | 8 | 9 | B |
| ✗ | 13 | 23 | 24 | 28 | 29 | 30 | May | 2 | 3 | 7 | R |
| ✗ | 8 | 9 | 22 | 23 | 24 | 28 | 31 | June | 1 | 2 | B |
| 6 | 16 | 17 | 21 | 22 | 23 | 25 | 26 | 30 | July | 1 | R |
| ✗ | 2 | 15 | 16 | 17 | 21 | 24 | 25 | 26 | 30 | Aug | 9 | B |
| 10 | 14 | 15 | 16 | 18 | 19 | 23 | 24 | 25 | Sep | 7 | 8 | R |
| 9 | 13 | 16 | 17 | 18 | 22 | Oct | 2 | 3 | 7 | 8 | B |
| 9 | 11 | 12 | 16 | 17 | 18 | 31 | Nov | 1 | 2 | 6 | R |
| ✗ | 9 | 10 | 11 | 15 | 25 | 26 | 30 | Dec | 1 | 2 | 4 | B |
| ✗ | ✗ | ✗ | 5 | 9 | 10 | 11 | 24 | 25 | 26 | 30 | ✗ | ✗ | R |

Fig. II.ᴬ

| Jany | 7 | 8 | 9 | 13 | 16 | 17 | ✗ | ✗ | B |
|---|---|---|---|---|---|---|---|---|---|
|  | 18 | 22 | Feby | 1 | 2 | 6 | 7 | 8 | ✗ | R |
| 10 | 11 | 15 | 16 | 17 | Mar | 2 | 3 | 4 | 8 | 11 | B |
| ✗ | 12 | 13 | 17 | 27 | 28 | April | 1 | 2 | 3 | 5 | R |
| 6 | 10 | 11 | 12 | 25 | 26 | 27 | May | 1 | 4 | 5 | B |
| 6 | 10 | 20 | 21 | 25 | 26 | 27 | 29 | 30 | June | 3 | R |
| 4 | 5 | 18 | 19 | 20 | 24 | 27 | 28 | 29 | July | 5 | B |
| 13 | 14 | 18 | 19 | 20 | 22 | 23 | 27 | 28 | 29 | Aug | 11 | R |
| 12 | 13 | 17 | 20 | 21 | 22 | 26 | Sep | 5 | 6 | 10 | 11 | B |
| 12 | 14 | 16 | 19 | 20 | 21 | Oct | 4 | 5 | 6 | 10 | 13 | R |
| 14 | 15 | 19 | 29 | 30 | Nov | 3 | 4 | 5 | 7 | 8 | B |
| ✗ | 12 | 13 | 14 | 27 | 28 | 29 | Dec | 3 | 6 | 7 | R |
| ✗ | ✗ | 8 | 12 | 22 | 23 | 27 | 28 | 29 | 31 | ✗ | ✗ | B |

Witnesses
[signature]
E. K. Sturtevant.

Inventor:
John S. McTear
by Pollok & Mauro
his attorneys (No Model.)  
J. S. McTEAR.  
CALENDAR PUZZLE.

No. 454,831. Patented June 23, 1891.

*Fig. III.*

*Fig. III.ᴬ*

Witnesses:  
Jno. B. Lilley  
E. K. Sturtevant.

Inventor:  
John S. McTear  
by Pollok & Mauro  
his attorneys.

(No Model.)  
6 Sheets—Sheet 5.

J. S. McTEAR.
CALENDAR PUZZLE.

No. 454,831.  
Patented June 23, 1891.

*Fig. IV.*

| | | | | | | | | | |
|---|---|---|---|---|---|---|---|---|---|
| Feby | 10 | 11 | 15 | 16 | 17 | 21 | × | × | R |
| | 22 | 23 | 27 | 28 | Mar | 1 | 5 | 6 | B |
| 7 | 11 | 12 | 13 | 17 | 18 | 19 | 23 | 24 | 25 | 29 | 30 | 31 | R |
| April | 4 | 5 | 6 | 10 | 11 | 12 | 16 | 17 | 18 | 22 | B |
| 23 | 24 | 28 | 29 | 30 | May | 2 | 3 | 7 | 8 | R |
| × | 9 | 13 | 14 | 15 | 19 | 20 | 21 | 25 | 26 | 27 | 31 | B |
| June | 1 | 2 | 6 | 7 | 8 | 12 | 13 | 14 | 18 | R |
| × | 19 | 20 | 24 | 25 | 26 | 30 | July | 1 | 2 | B |
| | 6 | 7 | 8 | 12 | 13 | 14 | 18 | 19 | 20 | R |
| Oct | 13 | 14 | 15 | 19 | 20 | 21 | 25 | 26 | 27 | 31 | B |
| Nov | 1 | 2 | 6 | 7 | 8 | 12 | 13 | 14 | 18 | 19 | R |
| 20 | 24 | 25 | 26 | 30 | Dec | 1 | 2 | 6 | 7 | B |
| × | 8 | 12 | 13 | 14 | 18 | 19 | 20 | 24 | 25 | 26 | 30 | R |

*Fig. IV<sup>a</sup>.*

| | | | | | | | | | |
|---|---|---|---|---|---|---|---|---|---|
| Feby | 12 | 13 | 14 | 18 | 19 | 20 | × | × | B |
| | 24 | 25 | 26 | Mar | 2 | 3 | × | × | R |
| 4 | 8 | 9 | 10 | 14 | 15 | 16 | 20 | 21 | 22 | 26 | 27 | 28 | B |
| April | 1 | 2 | 3 | 7 | 8 | 9 | 13 | 14 | 15 | 19 | R |
| 20 | 21 | 25 | 26 | 27 | May | 1 | 4 | 5 | 6 | 10 | B |
| × | 11 | 12 | 16 | 17 | 18 | 22 | 23 | 24 | 28 | 29 | 30 | R |
| June | 3 | 4 | 5 | 9 | 10 | 11 | 15 | 16 | 17 | B |
| × | 21 | 22 | 23 | 27 | 28 | 29 | July | 3 | R |
| × | 4 | 5 | 9 | 10 | 11 | 15 | 16 | 17 | 21 | B |
| Oct | 11 | 12 | 16 | 17 | 18 | 22 | 23 | 24 | 28 | 29 | 30 | R |
| Nov | 3 | 4 | 5 | 9 | 10 | 11 | 15 | 16 | 17 | 21 | B |
| 22 | 23 | 27 | 28 | 29 | Dec | 3 | 4 | 5 | 9 | 10 | R |
| × | 11 | 15 | 16 | 17 | 21 | 22 | 23 | 27 | 28 | 29 | 31 | B |

Witnesses:  
Jona B. Gilby  
E. K. Sturtevant

Inventor:  
John S. McTear,  
by Pollard Mauro,  
his attorneys.

(No Model.)  
6 Sheets—Sheet 6.

J. S. McTEAR.
CALENDAR PUZZLE.

No. 454,831. Patented June 23, 1891.

*Fig. V.*

| May | 4 | 5 | 6 | 10 | 11 | 12 | 16 | 17 | | R |
| | 18 | 22 | 23 | 24 | 28 | 29 | 30 | June | 3 | B |
| 4 | 5 | 9 | 10 | 11 | 15 | 16 | 17 | 21 | 22 | 23 | 27 | | R |
| | 28 | 29 | July | 3 | 4 | 5 | 9 | 10 | | B |
| | 11 | 15 | 16 | 17 | 21 | 22 | 23 | 27 | 28 | 29 | | R |
| Aug | 2 | 3 | 4 | 8 | 9 | 10 | 14 | 15 | 16 | 20 | B |
| 21 | 22 | 26 | 27 | 28 | Sep: | 1 | 2 | 3 | 7 | 8 | R |
| | 9 | 13 | 14 | 15 | 19 | 20 | 21 | 25 | 26 | 27 | B |
| Oct: | 1 | 2 | 3 | 7 | 8 | 9 | 13 | 14 | 15 | 19 | R |
| | 20 | 21 | 25 | 26 | 27 | 31 | Nov | 1 | 2 | B |
| | 6 | 7 | 8 | 12 | 13 | 14 | 18 | 19 | 20 | 24 | 25 | R |
| 26 | 30 | Dec: | 1 | 2 | 6 | 7 | 8 | 12 | 13 | B |
| | 14 | 18 | 19 | 20 | 24 | 25 | 26 | 30 | | R |

*Fig. V.A*

| May | 2 | 3 | 7 | 8 | 9 | 13 | 14 | 15 | | B |
| | 19 | 20 | 21 | 25 | 26 | 27 | 31 | June | 1 | R |
| 2 | 6 | 7 | 8 | 12 | 13 | 14 | 18 | 19 | 20 | 24 | 25 | 26 | B |
| | 30 | July | 1 | 2 | 6 | 7 | 8 | 12 | | R |
| | 13 | 14 | 18 | 19 | 20 | 24 | 25 | 26 | 30 | 31 | | B |
| Aug | 1 | 5 | 6 | 7 | 11 | 12 | 13 | 17 | 18 | 19 | R |
| 23 | 24 | 25 | 29 | 30 | 31 | Sept | 4 | 5 | 6 | 10 | B |
| | 11 | 12 | 16 | 17 | 18 | 22 | 23 | 24 | 28 | 29 | 30 | R |
| Oct | 4 | 5 | 6 | 10 | 11 | 12 | 16 | 17 | 18 | 22 | B |
| | 23 | 24 | 28 | 29 | 30 | Nov | 3 | 4 | | R |
| | 5 | 9 | 10 | 11 | 15 | 16 | 17 | 21 | 22 | 23 | 27 | B |
| 28 | 29 | Dec | 3 | 4 | 5 | 9 | 10 | 11 | 15 | | R |
| | 16 | 17 | 21 | 22 | 23 | 27 | 28 | 29 | 31 | | B |

Witnesses:
Jno. B. Riley
E. K. Sturtevant

Inventor:
John S. McTear
by Pollok & Mauro
his attorneys.

UNITED STATES PATENT OFFICE.

JOHN S. McTEAR, OF BELFAST, IRELAND.

CALENDAR PUZZLE.

SPECIFICATION forming part of Letters Patent No. 454,831, dated June 23, 1891.

Application filed November 29, 1890. Serial No. 373,077. (No model.)

*To all whom it may concern:*

Be it known that I, JOHN SMITH MCTEAR, solicitor, a subject of the Queen of Great Britain and Ireland, residing at Belfast, Ireland, have invented a certain new trick or game for arrangement for enabling dates to be readily ascertained without direct information as to the date required, of which the following is a specification.

The calendar-puzzle trick is based upon that part of mathematical science denoted "combinations," the combinations embraced being arranged in a systematic manner, so that the whole can be easily acquired and easily applied by any one of ordinary intelligence. The combinations are the total varieties or collections that can be formed out of six or less things combining together under certain conditions. To simplify the explanation, I will employ six flat counters and a board divided into two compartments, distinguished by one compartment being colored red and the other blue. The combinations to be produced are all the varieties that can occur in distributing the counters, six or less at a time, between the two compartments, without regard to the specific colors on which each division of counters appears—that is, if two certain counters were placed on red and another on blue they might be laid exactly the opposite way—viz., the same two on blue and the single one on red—without, under the given conditions, creating a new variation; or, in other words, the colored compartments are interchangeable.

In order to make the matter clear, I will particularize the combinations and explain the mode of obtaining them.

First. If we take the six counters and put all upon one compartment, we produce one combination.

Second. If we still employ the six, but place five of them on one of the compartments and the remaining counter on the other, it will be found in that arrangement we can obtain six combinations, for it is plain without working out the solution that on the compartment that contains the single counter we can only altogether produce six varieties of one counter each, and that opposite each of those varieties there must be a different five (being the remaining counters for the time being) in the other compartment.

Third. With the six counters divided into four and two we obtain by mathematical rule for the lesser division—namely, the number of times a different two can be produced out of the six $(6 \times 5 \div 1 \times 2)$—fifteen combinations, and as each time we place a two we produce in the remainder a four to correspond, finding the total number of varieties for one compartment gives the solution for both, which can be proved by applying the rule to the greater division and obtaining the same result.

Fourth. In the same way in the divisions of three and three we obtain $(6 \times 5 \times 4 \div 1 \times 2 \times 3)$ twenty combinations; but as the counters here are equally divided the consideration of the interchangeability of the colored divisions comes into play, and it will be found that the true answer, easily demonstrated, is exactly half—viz., ten combinations. The above exhaust the variations of six counters.

Five. Now using the total of five counters and placing them on one compartment with none on the other we shall find that we can produce six varieties out of the whole six, as shown in 2.

Six. Next, having four on one compartment and one on the other, we get out of the six counters for the four division $(6 \times 5 \times 4 \times 3 \div 1 \times 2 \times 3 \times 4)$ fifteen varieties; but having formed a set of four we have two counters remaining over for the other compartment, which takes only one and consequently gives two varieties for it opposite the same four. As that has equal application to every four formed, the total combinations are $(15 \times 2)$ 30.

Seven. Proceeding in a similar way, exhausting the varieties of the total of five, then taking the total of four, and so on, we shall find that on collecting all together the series will consist as shown in the following table:

| Total number of counters used at a time. | Number of the counters on one compartment. | Number of the counters on the other compartment. | Total number of combinations produced by that arrangement. |
|---|---|---|---|
| Six | Six | None | 1 |
|  | Five | One | 6 |
|  | Four | Two | 15 |
|  | Three | Three | 10 |
| Five | Five | None | 6 |
|  | Four | One | 30 |
|  | Three | Two | 60 |
| Four | Four | None | 15 |
|  | Three | One | 60 |
|  | Two | Two | 45 |
| Three | Three | None | 20 |
|  | Two | One | 60 |
| Two | Two | None | 15 |
|  | One | One | 15 |
| One | One | None | 6 |
| None | None | None | 1 |
|  |  | Total combinations | 365 | thus giving a number of combinations equal to the number of days in the year. Let us see now how this result is to be made available. Continuing with the illustration of the counters, first, if we color one side of each counter red and the other side blue we do away with the necessity of having the board, as then each counter, according to the side turned uppermost, will show of itself what compartment it belongs to; and next, if we distinguish the counters among themselves in some definite way—say by numbering them 0, 1, 2 to 5—we place ourselves in the position to construct a calendar-table, marking opposite each day a distinguishing combination. As the setting out in full of such a table here would be of no advantage, we will exemplify its construction by taking a date or two at random out of it as a sufficient illustration of the whole:

| Date. | Red counters, numbered. | Blue counters, numbered. |
|---|---|---|
| May 2 | 0 1 2 3 4 | 5 |
| July 14 | 1 4 | 2 3 5 |
| September 1 | 0 5 | — |
| November 23 | — | 1 4 5 |

Here it may very naturally be asked, how could any person learn off by rote such a collection of combinations so as to name any date in the year. We answer impossible, were it not for a simple and ingenious device in bringing to our aid some more mathematical science. If, instead of numbering the counters in the series 0 1 2 to 5, (progressing by the addition of one,) we distinguish them by the series 1, 3, 9, &c., (progressing by multiplication of three,) we obtain what is wanted, for if these latter numbers be marked on the counters and in each of the combinations one of the colors be considered plus and the other minus we obtain as the result not only a distinctive number to represent that combination, but we produce for the whole series the consecutive numbers from 1 to 365. Thus 1 by itself gives 1, 3 minus 1 produces 2, 3 by itself equals 3, 3 and 1 make 4, 9 minus 3 and 1 equals 5, 9 minus 3 equals 6, 9 and 1 minus 3 equals 7, 9 minus 1 equals 8, 9 equals 9, 9 and 1 equal 10, 9 and 3 minus 1 equal 11, and so on. Now, if we appropriate these representative numbers consecutively to the consecutive days of the calendar, we have the groundwork for surmounting our difficulty in applying the combinations to the calendar. To do so we turn the counters into cards with two sides, each containing the appropriate dates for the several combinations. Then the subject himself in finding his date exhibits to the performer the combination of the cards producing the required combination number, which the latter by the easy method, now to be explained, resolves at once into the date of the calendar.

The first thing to be done by the learner is to become acquainted with the cards, their values, and sides, which can be thoroughly mastered in five minutes. The following table contains the necessary particulars:

TABLE A.

| Index number of card. | O | I | II | III | IV | V |
|---|---|---|---|---|---|---|
| Index upon card |  | * | ** | *** | *<br>* | *<br>** |
| Value of card | 1 | 3 | 9 | 27 | 81 | 243 |
| The prime number | 364=The total of the card values. | | | | | |
| The final number | Red ∞ Blue=The day of the year. | | | | | |

Each card is known by its index, found on either side of it, being the filled-in square spaces in the right-hand corner at the foot of the calendar. All other filled spaces are to be disregarded. The index-number is named by the spaces, the single upper space in cards having a double row, (cards IV and V,) representing three spaces. Thus card O has no filled space, card III has three in the foot row, card V has two in the foot row equals two and one above equals three; total, five. The value of the card next in order is three times that of its predecessor, commencing with unity, and the addition of all the values is three hundred and sixty-four, the prime number being one less than the days in the year. The dates on the cards run in calendar order in rows from the top, read in each row from left to right, and all the dates following the name of a month belong to that month, whether in the same row or not, until the name of a new month appears. These rows, it will be observed, are alternately red and blue, which not only serve to show the rows plainly, but to distinguish the two sides of the card. On one side of a card the rows commence and end with red, and on the other or reverse side they commence and end with blue. These sides of the cards are named "red" and "blue," respectively, following the extreme rows, and a card is called for the time being a "red card" or a "blue card," according to the side on which the date appears. The cards without the date in question are for the time being "blank." As to the final number, the remark in the table A expresses that if the total values of the red cards be taken from the total values of the blue cards, or the blue from the red, according to which is the greater, the difference gives the day of the year—e. g., the thirty-third day of the year is the 2d of February and the one hundred and eighty-first is the 30th of June, &c. It will be noticed that both the index and the side of a card can be seen in the one glance. Compare the indexes in the table with the cards, and when understood learn to substitute mentally the value of a card for its index. Thus instead of noting from the index that a card is, say IV, know it as 81. Having comprehended the above, in which the steps to obtain the final (or combination) number are explained, what has now to be acquired is the method of resolving the final number into its date. To do that the performer must learn by heart the following table:

TABLE B.

| No. | Is the last day of | No. | Is the last day of | No. | Is the last day of |
|---|---|---|---|---|---|
| 31 | January | 151 | May | 273 | September |
| 59 | February | 181 | June | 304 | October |
| 90 | March | 212 | July | 334 | November |
| 120 | April | 243 | August | 365 | December | which should be so acquired as to become as familiar as one of the tables of multiplication. These figures are called the "terminal dates," and the performer is not up to the mark unless he can tell at once the month from the terminal date without having mentally to run over the table, and likewise the terminal date of any named month. Properly armed with this, its date can be told instanter from the final number by simply subtracting the next lower terminal number, when the remainder names the day in the next month—the answer required. Thus suppose the final number to be 259, taking therefrom 243, August terminal number, leaves 16th September—the date. As the values of the cards only cover three hundred and sixty-four days, (to 30th December,) they would leave two days unprovided for—namely, the 31st December and the 29th February of leap-year. These dates are included in the following way: First, 0 (the date not appearing on either side of any card) is regulated to 29th February; second, 364 made on the red side equals 30th December, made on the blue side equals 31st December. This latter arrangement points out that the colors are available for producing extra combinations, (practically doubling the number,) but as their use in this way would not lessen the number of cards in the magic calendar they would be of no advantage to it.

The subject having been instructed how to find a date, and having fixed upon a date in his mind, the performer takes the six cards into his hand and gives them one by one to the subject, taking care that they are all presented on the same side, either red or blue indifferently, and noting the value of each card as or before he presents it. The subject looks for his date on a card on getting it, and is directed to keep each card the date is on and return each card it is not on. As this is proceeding the performer mentally adds together the values of the cards on which the date appears—i. e., those kept, taking no account at present of the others rejected. Having disposed of the six cards and got his first total or plus number, he presents the other side of the rejected cards to the subject one by one, noting their respective values, and requesting him to find the date and keep, as before, those cards on which it appears, rejecting the others. Any of the cards now rejected by the subject are also rejected again by the performer, and of those retained the second time the values are minus. These are to be subtracted, as the cards are kept, from the plus number previously obtained, and the remainder mentally retained. Should the minus numbers exceed the plus, any values coming after are of course to be added to the remainder, and not subtracted from it. The net number obtained at the end of the second search is the final number, which is also the day of the year, and the performer resolves it into the day of the month in manner previously shown and names it. If the performance has been properly executed by both parties, that is the date that was selected. For examples:

First. Suppose the date chosen was 10th August and the red sides of the cards were first presented, the subject would retain out of the six cards—cards II=9 and V=243, total 252—the plus number. On the second time cards O, I, III, and IV would be re-presented on their blue sides, the subject retaining I=3(252−3=249) and III=27(249−27=222) then 222−212 (July) leaves 10th August—the answer.

Second. Again, suppose the same date were chosen and the blue sides first presented. The cards first retained would be—cards I=3, III=27, total 30—the plus number. The second time, cards O, III, IV, and V would be re-presented on their red sides and he would keep II=9(30−9=21) and V=243(−243+21=222) and as before, 222−212 (July) leaves 10th August.

Third. All the cards being rejected on their red sides and on the blue sides, the retained being O=1, III=27, IV=81; total 109−90 (March)=19 April—the date selected. Should the performer happen to omit taking the values for the plus number or make any mistake about it, he can readily obtain it before commencing the second round by subtracting from the prime number 364 the values of the rejected cards given back to him, and it would always be well, having at this stage the time or the opportunity to make the time, to thus check and see that his plus number is right before proceeding.

The accompanying drawings show the way in which the cards may be marked in accordance with the foregoing explanation. Figures O, I, II, III, IV, and V are the faces of each card, and figures O$^A$, I$^A$, II$^A$, III$^A$, IV$^A$, and V$^A$ are the backs of each corresponding card. On both the backs and the faces of the cards the lines of figures are printed alternately in a different way—say in different colors (blue and red for instance.) On the face side this way of printing is the reverse of that on the backs—that is, if colors be used and the bottom line on the faces be red, then the bottom line on the backs will be blue, the third, fifth, and seventh lines, and so on from the bottom on the faces will be red, and the third, fifth, and seventh lines from the bottom on the backs will be blue, and the lines between will be the reverse color in each case. In the drawings the lines are marked R and B (for "red" and "blue") to show this clearly.

In order to avoid numbering the cards, the unnumbered spaces—say in the right-hand bottom corner—may be arranged to show the number of each card, as shown in table A.

Besides the ordinary method there are other modes of obtaining the final number, one the following, ascertaining it from the rejected cards alone. Let D equal the date of the year, $t$ equal 364, $f$ equal the total values of the cards first rejected, and $s$ equal the total values of the cards rejected the second time, upon which we obtain the following formula:

$$D = \begin{matrix}(1) 2f - t - s \text{ (or)} \\ (2) t - 2f + s\end{matrix}$$

both being the same, except in having the plus and minus signs reversed. The rule therefore deducted from the formula is, double the first rejection and subtract 364. If the remainder be plus, subtract the second rejection; if minus, add it. The result is the final number. As examples, take those given before:

First. 10th August. The rejected red cards would be O=1, I=3, III=27, IV=81; total, 112×2=224−364=−140. The rejected blue cards would be O=1, IV=81; total, 82. Then −140−82=222 (final number) −212=10th August.

Second. Same date. The rejected blue cards would be O=1, II=9, IV=81, V=243; total, 334×2=668−364=+304. The rejected red would be O=1, IV=81; total, 82. Then +304−82=222 (final number) −212=10th August.

Third. 19th April. All the red cards rejected=364×2=728−364=+364. The blue rejected are I=3, II=9, V=243; total, 255. Then +364−255=109 (final number) −90= 19th April.

Another way is to present the cards indiscriminately as to their sides and keep both the additions separate until all the cards are disposed of, or else subtract or add each properly at the time, taking care, however, that the cards rejected as not having the date have their other sides searched for the date as well. By calling the respective calculations, or the result of them, as you proceed, red or blue, and adding same colors and subtracting different colors, this mode is quite practicable with accuracy. Other ways will suggest themselves to the intelligent and instructed performer.

I claim as my invention—

1. A series of cards having each two tables composed of dates arranged in lines or columns, as described, and an index indicating the value of the card, the two tables on the same card being distinguishable, as by the use of different colors, substantially as and for the purposes set forth.

2. A series of six cards having on each side a table of dates in calendar order, the two sides being distinguishable, as by different colors, and each card having a definite value indicated by an index thereon, whereby a given date can be ascertained from the value of the cards upon which such date appears, substantially as described.

In testimony whereof I have signed my name to this specification in the presence of two subscribing witnesses.

J. S. McTEAR.

Witnesses:
WILLIAM F. UPTON,
47 *Lincoln's Inn Fields, London, W. C.*
W. I. WEEKS,
9 *Birchin Lane, London, E. C.*